United States Patent

Shimizu

[19]

[11] Patent Number: 5,862,539
[45] Date of Patent: Jan. 26, 1999

[54] WATER SAVING DEVICE FOR FLUSH TOILETS

[76] Inventor: Kiyoshi Shimizu, 226 Shindenshintamashiro Hisagoyama-cho, Kuze-gun, Kyoto-fu, Japan

[21] Appl. No.: 842,618

[22] Filed: Apr. 15, 1997

[51] Int. Cl.⁶ .................................................. E03D 1/00
[52] U.S. Cl. .................................................. 4/415; 4/324
[58] Field of Search ................ 4/415, 324, 325, 4/395, 661

[56] References Cited

U.S. PATENT DOCUMENTS 3,036,313  5/1962  Jenkins ........................................ 4/324
3,982,283  9/1976  Goldring ...................................... 4/324
4,928,327  5/1990  Kuhn ........................................... 4/415

*Primary Examiner*—David J. Walczak
*Attorney, Agent, or Firm*—Shook, Hardy & Bacon L.L.P.

[57] ABSTRACT

A convenient water saving device for flush toilets, which includes one or more main bodies having center holes through which a pull chain passes, wherein the main bodies have chain access slits which extend from the center holes to the outside of the main bodies, and staple insertion holes provided on both sides of the slits. The main bodies are used in combination with a slip-prevention staple which straddles the chain access slits to close slits.

5 Claims, 7 Drawing Sheets

WATER SAVING DEVICE FOR FLUSH TOILETS

FIELD OF THE INVENTION

The present invention relates to a water saving device, and more particularly relates to a water saving device for flush toilets which saves water by hastening the timing of the closing of the rubber float valve in the water tank.

BACKGROUND OF THE INVENTION

The present invention is directed to a water saving device for use as an accessory for flush toilets of the type as shown in FIGS. 16 and 17 having a rubber float valve c which opens and closes drain opening b in water tank a. Rubber float valve c is lifted up and opens when pull chain d is pulled upward by the operation of lever f, and the water in water tank a flows out through drain opening b into the toilet bowl. At that time, rubber float valve c closes from the lifted-up position by its own weight at a prescribed timing. However, the closure timing is too slow given the amount of water needed such that water is wasted.

In order to address this problem, it has been known to use a water saving device A for flush toilets attached to the part of rubber float valve c to which chain d is connected, as shown in FIGS. 16 and 17, so as to become a control weight. Accordingly, compared to the case of simple rubber float valve c, the closure timing of drain opening b is hastened by the weight of water saving device A, and the amount of water flowing out is decreased, thus saving water.

This prior water saving device A can be a donut shape provided with opening e in the center through which pull chain d is passed, as shown in FIG. 19, or it can be a dome shape which follows the spherical exterior surface of rubber float valve c, as shown in FIG. 18 which can be formed of metal, synthetic resin, or the like. However, in order to attach the water saving device A of the prior art, it is necessary to pass pull chain d through center opening e. In order to do so requires the work of first disconnecting either the bottom end or the top end of chain d, and then reconnecting same (after passing it through center opening e). The same problem arises if water saving device A is no longer needed and must be removed, or if it is desired to change the device.

In order to solve this problem, it has been considered to provide a slit opening outwards from opening e. However, water saving device A can move because of the pull on pull chain d or the accompanying water flow in water tank a, causing pull chain d to pass from opening e back through the slit to the outside, and resulting in the water saving device slipping off (the rubber float). Various measures have been considered to prevent pull chain d from passing back through the slit; however, when the construction of the water saving device thereby becomes complicated, or the number of water saving devices is changed, it becomes difficult to remove the devices, and inconvenient.

Accordingly, the present invention has as its object the provision of a water saving device for flush toilets which solves the above-described problems, prevents the passing back through of the pull chain, without making the construction complicated, and makes changing the weight and/or number of the devices convenient.

SUMMARY OF THE INVENTION

These and other object are achieved by a water saving device for flush toilets which is attached in the vicinity of the connection part of a pull chain connected to a rubber float valve which opens and closes a drain opening in a water tank, and which hastens the timing of the closing of the rubber float valve. The device comprises: (i) a main body having a center opening through which said chain is passed, a chain access slit extending from the center opening to the outside of the device, and staple insertion holes provided on both sides of the slit; and (ii) a staple which straddles said chain access slit, both ends of which pass through said staple insertion holes and close the slit to prevent the device from falling off the chain.

With this type of construction, the attachment of the main body can be carried out by passing the pull chain through the center opening from the outside of the device through the chain access slit in the main body, without the troublesome task of disconnecting the chain as in some prior art devices. Also, by inserting both ends of the slip-prevention staple into the staple insertion holes after the pull chain is passed through the center hole, thereby closing the slit, the chain can be prevented from slipping out of the main body. Accordingly, even if the main body should move because of a pull on the pull chain, or the accompanying water flow in the water tank, the pull chain can be prevented from slipping out of the main body from the center opening back through the slit. By inserting both ends of the slip-prevention staple into the two staple insertion holes, the device does not easily slip off the chain and the above-described slip-prevention function is fully achieved. Because the insertion and removal of the two ends can be accomplished both quickly and easily, the removal and exchange of the main body is convenient.

In one embodiment, the main body consists of a plurality of main bodies whereby, by variously stacking main bodies of the same weight or assembling main bodies of different weights and thereby finely adjusting the weight, the timing of the closure of the rubber float valve can be adjusted at will while observing the state of the water discharged into the toilet bowl. In this embodiment, the plurality of main bodies may have irregular configurations which interlock when the main bodies are stacked one on another, whereby, because of the interlocking condition due to the irregular configurations, the stack of main bodies can be prevented from collapsing and the instability when a plurality of main bodies is used can be controlled, in addition to preventing slippage of the main bodies off the pull chain as previously stated.

In a preferred embodiment, the interlocking parts may constitute rotation-preventing irregular configuration parts which prevent the main bodies stacked one on top another from rotating vis-à-vis one another. In addition to preventing the collapse of the stacked water saving devices, the instability of the devices may be further controlled by stacking the devices so that their slits face opposite each other, such that the slit of one device is closed by the non-slit part of the device stacked above or below it. By stacking the devices in this orientation, it is possible to eliminate the necessity of using a slip prevention staple in each stacked main body.

DETAILED DESCRIPTION OF THE PREFERRED EMBODIMENTS

Two embodiments of a water saving device in accordance with the present invention will be explained in more detail with reference to FIGS. 1–16. This water saving device as explained with reference to the prior art designs shown in FIGS. 16–19 is attached in the vicinity of the connection part of pull chain 4 connected to rubber float valve 13 which opens and closes the drain opening in a water tank provided on a toilet. This water saving device hastens the timing by which rubber float valve 13 closes the drain opening and limits the amount of water flowing through the drain.

First Embodiment

Figure 1:
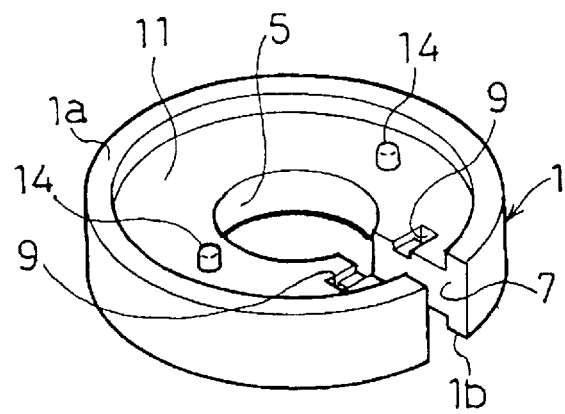
FIG. 1 is a perspective view showing a main body of a water saving device in accordance with a first embodiment of the present invention.
Figure 2:
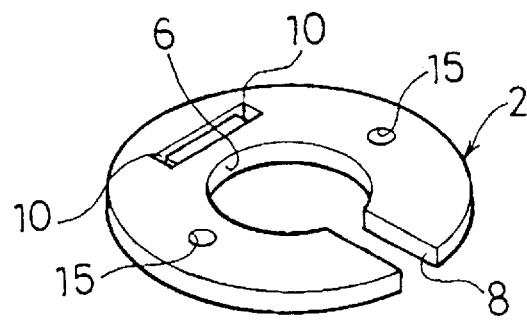
FIG. 2 is a perspective view showing a sheet-like main body of a water saving device in accordance with a first embodiment of the present invention.
Figure 3:
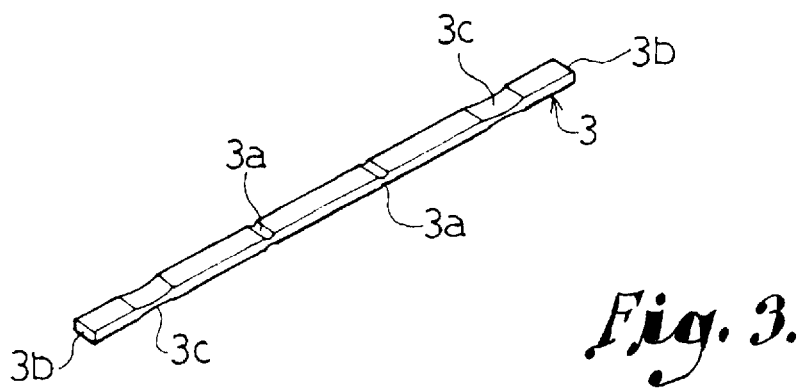
FIG. 3 is a perspective view showing a staple to be used with the main bodies of FIGS. 1 and 2.
Figure 4:
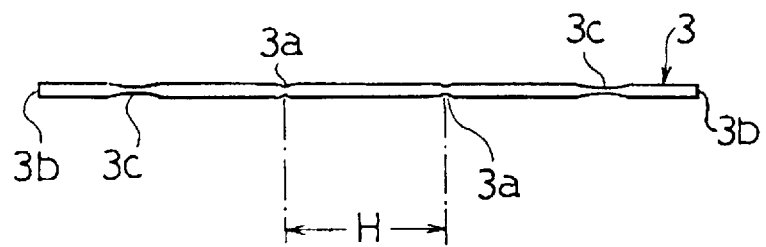
FIG. 4 is a side view of the staple of FIG. 3.
Figure 10:
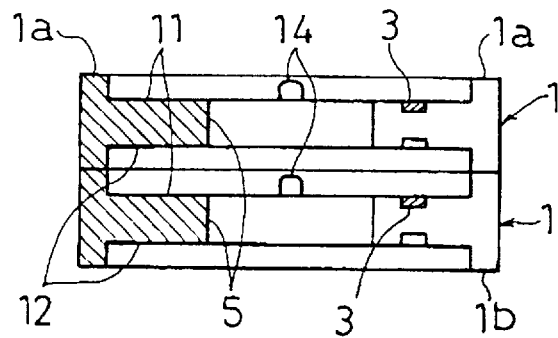
FIG. 10 is a side cross-sectional view showing two main bodies of FIG. 1 in a stacked configuration.

FIG. 1 and FIG. 10 show a water saving device for a flush toilet in accordance with a first embodiment of this invention. This water saving device is comprised of, assembled together, a disk-shaped main body 1, as shown in FIG. 1; a circular, sheet-shaped main body 2 used for fine adjustment of main body 1, as shown in FIG. 2; and slip-prevention staple 3, as shown in FIGS. 3 & 4. Main body 1 is preferably made of cast metal having a weight of about 35 g, while sheet-shaped main body 2 is preferably brass having a weight of about 10 g. Main bodies 1 and 2 both have provided in the centers thereof openings 5 and 6 through which pull chain 4 may pass (FIG. 6) and from those openings 5 and 6 to the outside of the devices are provided chain access slits 7 and 8. By passing pull chain 4 through slits 7 and 8 to openings 5 and 6, the water saving device can be attached without the troublesome work of disconnecting chain 4.

Two staple insertion holes 9 are provided on both sides of slit 7 in main body 1. On the other hand, two staple insertion holes 10 are provided 180° on the opposite side from slit 8 in main body 2. Slip prevention staple 3, which is inserted in staple insertion holes 9 and 10, is formed by narrowly cutting a stainless steel sheet. Staple insertion holes 9 and 10 are rectangularly provided to match the cross-sectional shape of the two end portions 3*b* of slip-prevention staple 3, which preferably has a width ranging from 0.2 mm–0.3 mm. Pressure marks 3*a* are inscribed in four places on the front and back surfaces of the middle portions of slip-prevention staple 3 where it bends at staple insertion holes 9 and 10. A space is provided between pressure marks 3*a*, this space indicated by the letter H may be about 10 mm.

Figure 7:
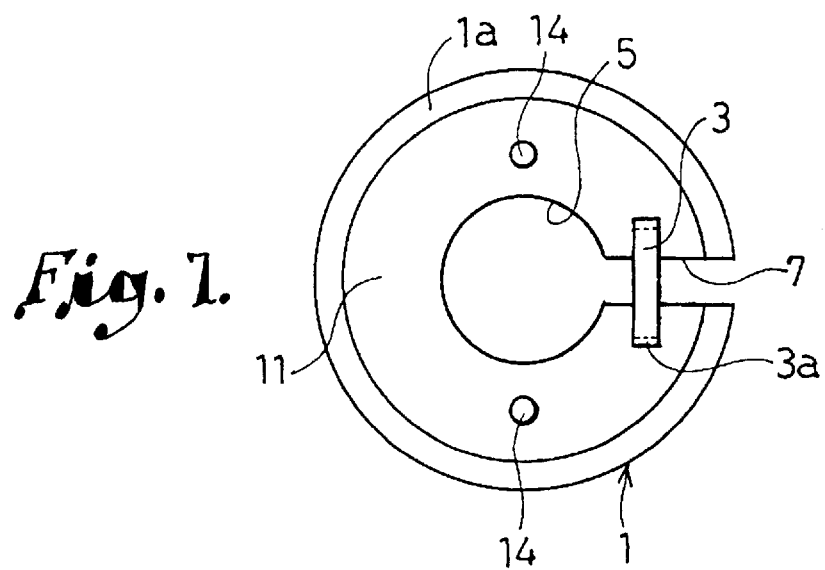
FIG. 7 is a top plan view of the main body of FIG. 1 with the staple in place.
Figure 8:
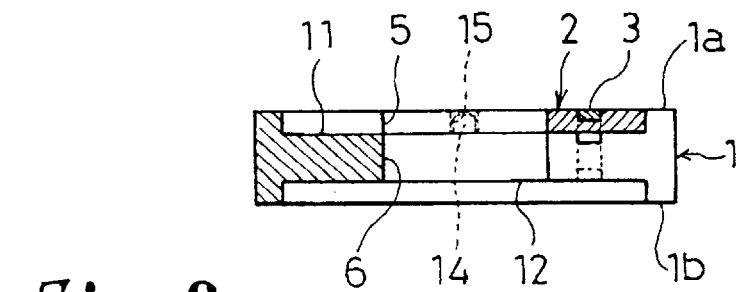
FIG. 8 is a side cross-sectional view showing the main bodies of FIGS. 1 and 2 in a stacked configuration.
Figure 9:
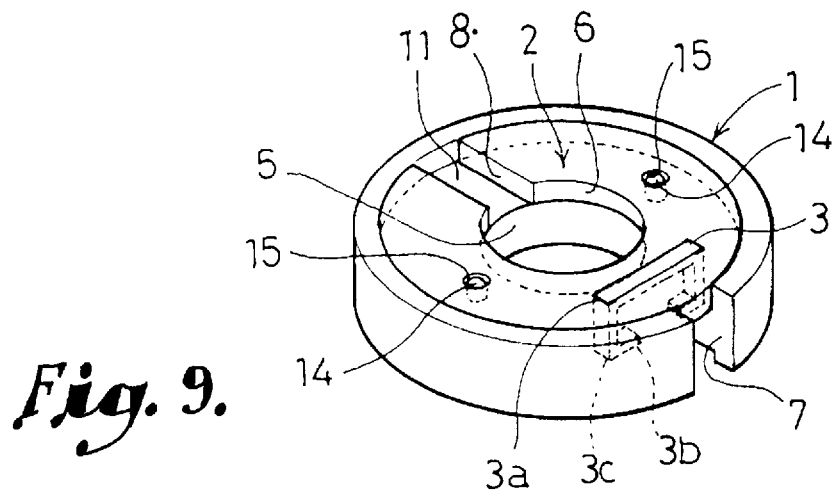
FIG. 9 is a perspective view of the object of FIG. 8.

As shown in FIGS. 8 & 9, main body 1 can be used in combination with sheet-like main body 2, or as shown in FIG. 10, two main bodies 1 can be used stacked one on top the other. However, as the method of applying slip-prevention staple 3 to main body 1 is the same in either case, the case of using main body 1 by itself, as shown in FIGS. 5 thru 7, will be explained.

Figure 5:
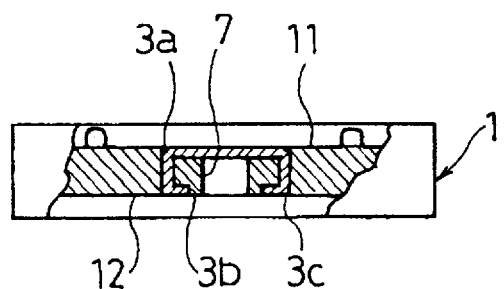
FIG. 5 is a side cross-sectional view of the main body of FIG. 1.

As shown in FIG. 5, slip-prevention staple 3 is first bent at pressure marks 3*a*, and then both ends 3*b* are inserted into staple insertion holes 9. After insertion, the tips of both ends 3*b* are further bent at the back surface of recessed part 12 of the water saving device (described later) so that slip-prevention staple 3 is prevented from slipping out. However, it is not particularly necessary to prevent slip-prevention staple 3 from slipping out. The tips are bent using pressure markings 3*c*. Pressure markings 3*c* are larger than pressure markings 3*a*, so that the tips can be easily bent at any location along pressure markings 3*c*. Therefore, differences in the thickness of main bodies 1 and 2 are accommodated.

As indicated above, when slip-prevention staple 3 is inserted into staple insertion holes 9 & 10, slip-prevention staple 3 straddles slits 7 & 8, thereby closing slits 7 & 8. Accordingly, pull chain 4 can be prevented from slipping out of main bodies 1 & 2.

Figure 6:
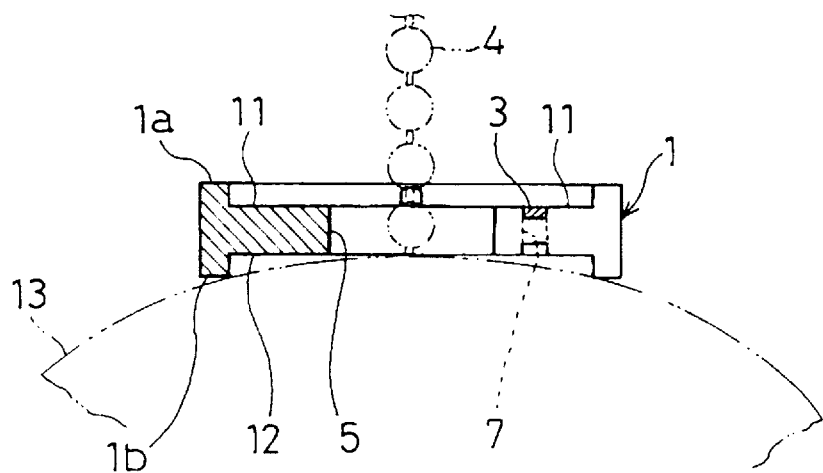
FIG. 6 is a side cross-sectional view showing the main body of FIG. 1 in use with the pull chain and other portions of the flush toilet shown in dotted lines.

The front and back surfaces of main body 1 are such that recessed parts 11 & 12 are formed within external circumferential rim parts 1*a* & 1*b*, and recessed part 12 causes main body 1 to rest securely on the spherical surface of rubber float valve 13, as shown in FIG. 6. Also, the internal circumference of external circumferential rim part 1*a* is practically the same as the external circumference of sheet-like main body 2. Accordingly, as shown in FIGS. 8 & 9, this device is designed so that when main bodies 1 & 2 are combined, main body 2 fits snugly into recessed part 11 of main body 1. Because of this interlocking, the stack of main bodies 1 & 2 used in combination can be prevented from crumbling or becoming unstable due to the pull of pull chain 4 or the accompanying water flow inside the water tank. Although pull chain 4 is passed through main bodies 1 & 2 in order to install them, after pull chain 4 has been passed through bodies 1 & 2, slits 8 & 9 in bodies 1 & 2 face 180° in opposite directions, and both ends 3*b* of slip-prevention staple 3 are inserted into staple insertion holes 9 & 10, which are in alignment in this state. Accordingly, main bodies 1 & 2 can be combined as if a single body, and a firmer coupling can be achieved. In this sense, it is preferable if the tips of both ends 3*b* are bent at this time as well, after insertion.

Two small projections 14 are provided on both sides of hole 5 in the center of recessed part 11, and two small holes 15 are provided in main body 2 so as to engage the small projections 14. Accordingly, when main bodies 1 & 2 are put together, small projections 14 and small holes 15 engage each other and serve a rotation-prevention function, thereby maintaining slits 8 & 9 in a state where they face 180° opposite each other. Therefore, because of this alone, even without the use of slip-prevention staple 3, main bodies 1 & 2 close slits 8 & 9 of each other with the part of each body where there is no slit 7 or 8, and pull chain 4 can be prevented from slipping out of main bodies 1 & 2.

In this first embodiment, the stacking of main bodies 1 & 2 is especially unlikely to collapse because of the fitting of sheet-like main body 2 within main body 1, and the engaging of small projections 14 and small holes 15, so that it is particularly appropriate to omit the use of slip-prevention staple 3.

Thus, when main bodies 1 & 2 are used as water saving devices, main body 1 can be used by itself (preferably having a weight of about 35 g) as already explained and shown in FIGS. 6 & 7. Main bodies 1 & 2 can alternately be combined and used together (preferably to result in a weight of about 45 g) as shown in FIGS. 8 & 9. Alternately, two main bodies 1 can be used together (preferably resulting in a weight of about 70 g) as shown in FIG. 10, thereby changing the number and combinations to adjust the weight.

The relationship among the weight of the water saving device, the amount of water used, the amount of water saved, the percentage of water used, and the percentage of water saved, based on the results of experiments using a toilet having a water tank with a capacity of 13 liters, are shown in Table I below. The average values of these results are shown in Table II below.

TABLE I

| Device Wgt. | Water Amt. | Amt. Saved | % Used | % Saved |
|---|---|---|---|---|
| 0 g. | 14.27 1. | 0.00 1. | 100.00% | 0.00% |
| 25 g. | 12.73 1. | 1.53 1. | 89.25% | 10.75% |
| 30 g. | 12.47 1. | 1.80 1. | 87.38% | 12.62% |
| 35 g. | 12.30 1. | 1.97 1. | 86.21% | 13.79% |
| 40 g. | 11.73 1. | 2.53 1. | 82.24% | 17.76% |
| 45 g. | 11.53 1. | 2.73 1. | 80.84% | 19.16% |
| 50 g. | 11.10 1. | 3.17 1. | 77.80% | 22.20% |
| 60 g. | 10.60 1. | 3.67 1. | 74.30% | 25.70% |
| 75 g. | 9.83 1. | 4.43 1. | 68.93% | 31.07% |

TABLE II

| Device Wgt. | 1st Trial | 2nd Trial | 3rd Trial | Average |
|---|---|---|---|---|
| 0 g. | 14.2 1. | 14.3 1. | 14.3 1. | 14.27 1. |
| 25 g. | 12.8 1. | 12.6 1. | 12.8 1. | 12.73 1. |
| 30 g. | 12.4 1. | 12.5 1. | 12.5 1. | 12.47 1. |
| 35 g. | 12.3 1. | 12.2 1. | 12.4 1. | 12.30 1. |
| 40 g. | 11.7 1. | 11.8 1. | 11.7 1. | 11.73 1. |
| 45 g. | 11.5 1. | 11.5 1. | 11.6 1. | 11.53 1. |
| 50 g. | 11.1 1. | 11.0 1. | 11.2 1. | 11.10 1. |
| 60 g. | 10.5 1. | 10.6 1. | 10.7 1. | 10.60 1. |
| 75 g. | 9.8 1. | 9.9 1. | 9.8 1. | 9.83 1. |

Moreover, the material and shape of main bodies 1 & 2 and slip-prevention staple 3, the shape of staple insertion holes 9 & 10, and the shape and construction of the interlocking portions when main bodies 1 & 2 are stacked, can be varied.

Second Embodiment

FIGS. 11 thru 15 show a water saving device for flush toilets in accordance with a second embodiment of the invention. This water saving device is comprised of the combination of a disk-shaped main body 15 and the slip-prevention staple 3 described above with reference to the first embodiment. Main body 15 may be formed of ceramics having a preferred weight of 30 g. Hole 16 provided in the center through which pull chain 4 passes, and chain access slit 17 are the same as described with reference to the first embodiment above.

Figure 11:
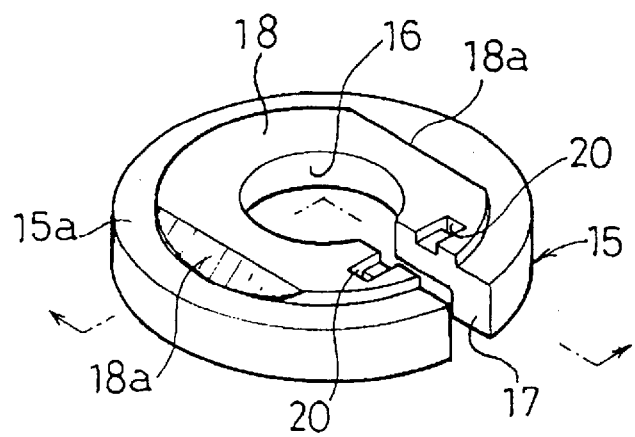
FIG. 11 is a top perspective view of a main body of a water saving device in accordance with a second embodiment of the present invention.
Figure 12:
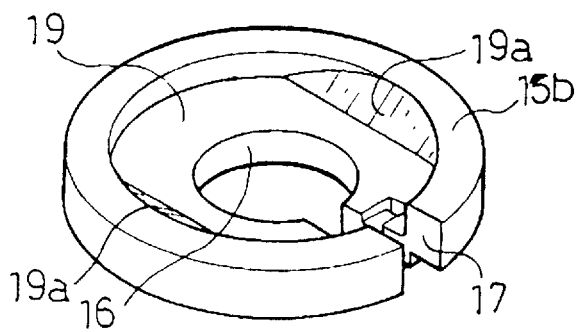
FIG. 12 is a bottom perspective view of the main body of FIG. 11.
Figure 13:
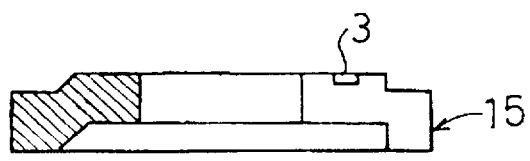
FIG. 13 is a side cross-sectional view of the main body of FIG. 11.

The water saving device of this second embodiment is such that the front surface and the back surface have practically identical recessed configurations and protruding configurations, so that they interlock when stacked one on top another. That is, as shown in FIG. 11, on the front surface protruding portion 18 is formed inside of circumferential rim 15*a*. On the other hand, as shown in FIG. 12, on the back surface recessed portion 19 is formed inside of circumferential rim 15*b*. Tapered surfaces 18*a* & 19*a* are formed, diametrically opposed, on both sides of protruding portion 18 and recessed portion 19, respectively, as irregular surfaces to prevent rotation when main bodies are stacked one on another.

Figure 14:
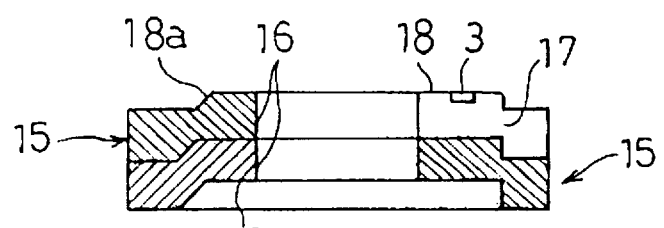
FIG. 14 is a side cross-sectional view showing two main bodies of FIG. 11 in a stacked configuration.

Looking to FIG. 11, the construction whereby slip prevention staple 3 is bent and inserted into staple insertion holes 20 is the same as described above with reference to the first embodiment. Moreover, when two main bodies 15 are used stacked together as shown in FIG. 14 so that the stack will not easily collapse, chain 4 is passed through each main body 15. However, by arranging chain access slits 17 so that they face 180° opposite each other, the part of each main body 15 where there is no slit 17 acts to close the slit 17 of the other main body 15 and prevent pull chain 4 from slipping out of that main body 15. Therefore, it is possible to eliminate the necessity of using a slip-prevention staple 3 in each main body 15. Moreover, if the protrusions and recessions are increased so that the interlock is deepened, the stability of the stack is increased, and the omission of slip-prevention staple 3 becomes even more appropriate.

Figure 15:
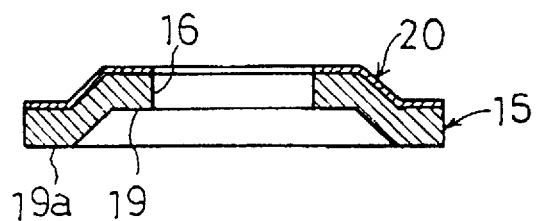
FIG. 15 is a side cross-sectional view showing the main body of FIG. 11 and a sheet like main body in stacked configuration.
Figure 16:
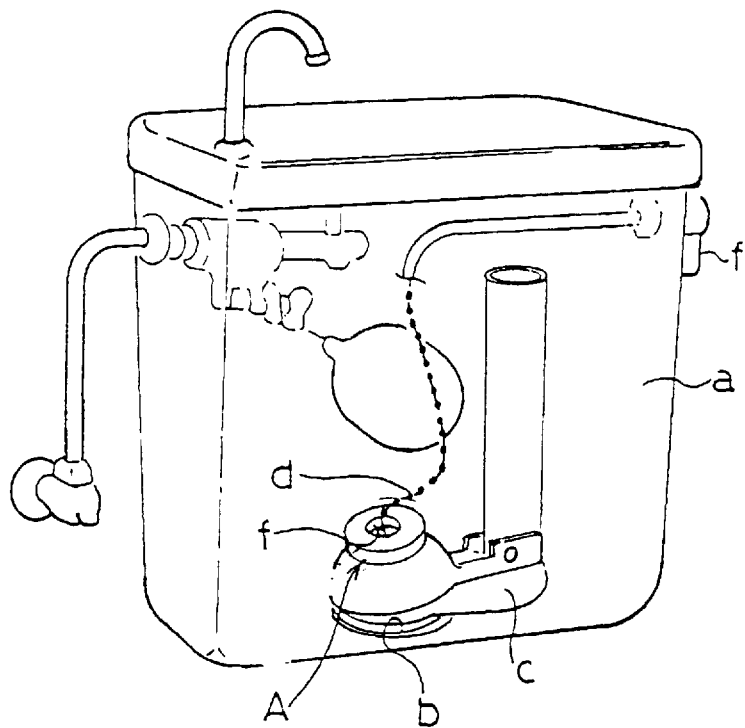
FIG. 16 is a perspective view showing a water saving device of the prior art in use.
Figure 17:
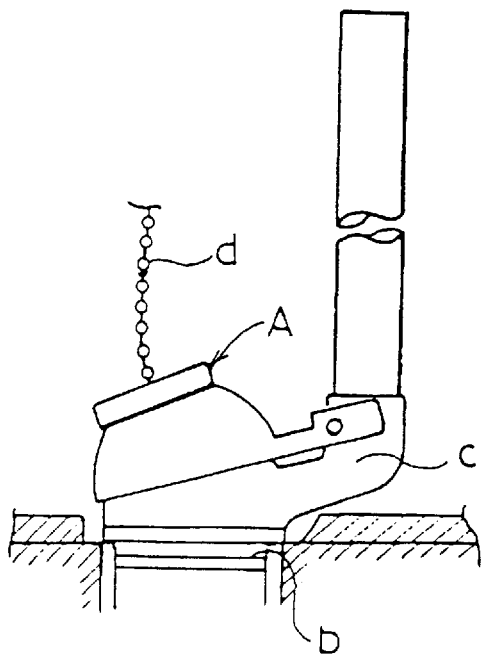
FIG. 17 is a side view of the water saving device in FIG. 16.
Figure 18:
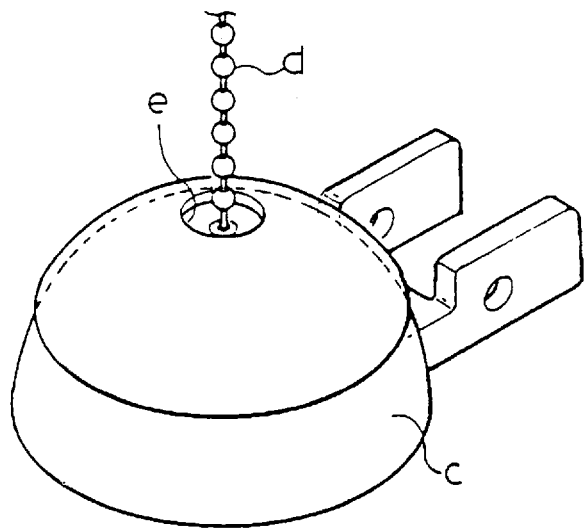
FIG. 18 is a perspective view showing a water saving device of the prior art.
Figure 19:
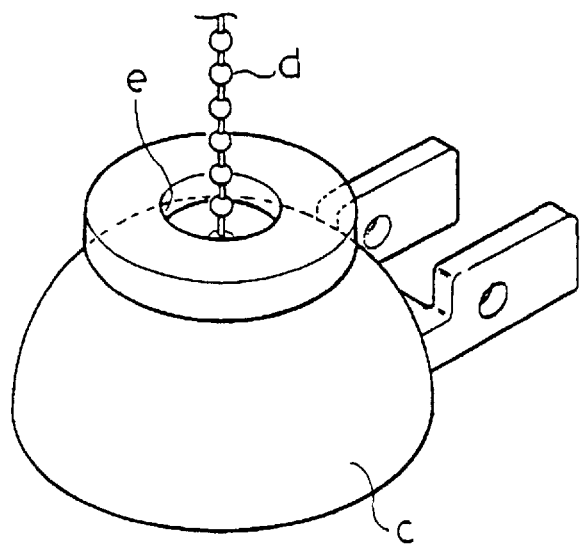
FIG. 19 is a perspective view showing another water saving device of the prior art.

FIG. 15 shows a main body 15 preferably made of ceramics and a thin body 20 formed of a thin material, stacked together. Thin Body 20 is made of metal, such as stainless steel, or the like and preferably weighs 10 g. It is formed in a shape that follows that of the front surface of main body 15 and is used for fine adjustment.

In this second embodiment, the material and shape of main bodies 15 & 20, the shape of the protrusions and recesses for stacking, and the interlocking shape and construction of the rotation attachment surface can be varied.

In accordance with this invention, attachment of the water saving devices can be carried out without the troublesome task of disconnecting the pull chain, and the chain can be prevented from slipping out by the action of the slip-prevention staple, which closes the slit, without a complicated construction. The pull chain can be prevented from passing back through the slit and slipping out of the main body, and the water saving device slipping off, due to the effect of a pull on the pull chain or the accompanying water flow in the water tank, or the like. Moreover, the insertion and removal of the slip-prevention staple can be accomplished rapidly and easily, making the attachment, removal and changing of the device convenient.

By using devices of the same weight stacked one on top another, or by using devices of different weights in combination with each other and thereby finely adjusting the weight, the closure timing of the rubber float valve can be adjusted at will while observing the state of the flow of water discharged into the toilet bowl, thus making the device convenient to use.

The interlocking condition of the combination of main bodies having differing weights and sizes prevents the collapse of the stack of separate main bodies, and controls instability when a plurality of main bodies are used, in addition to preventing the slipping off of the main bodies themselves. Furthermore, by stacking devices so that the slits face 180° in the opposite direction, the part of one device where there is no slit acts to close the slit of the other device, so that it is possible to omit the use of the slip-prevention staple in each main body that is stacked, while further preventing the instability of the stack.

What is claimed is:

1. A water saving device for flush toilets of the type having a water tank with a drain opening, a float valve controlling said drain opening and adapted to be raised by a pull chain to open said opening and to return toward a closed position as the water level falls in the tank, said pull chain being connected with said float valve and extending generally upwardly therefrom, said water saving device adapted to be attached in the vicinity of a connection point between the pull chain and float valve and comprising:

a main body having a central opening adapted to receive therethrough the pull chain when the main body is positioned on the float valve, said main body including a chain access slit extending outwardly from said central opening to the perimeter of said main body and staple insertion holes through said main body on opposite sides of said slit;

a staple which straddles said chain access slit and both ends of which pass through the respective insertion holes whereby the staple closes the slit to prevent the device from separating from the chain; and a second main body, said main bodies having irregular configurations that interlock when the main bodies are placed one on top another.

2. The water saving device for flush toilets of claim 1, wherein the irregular configurations that interlock prevent the main bodies lying one on top another from rotating vis-à-vis each other.

3. A water saving device for flush toilets of the type having a water tank with a drain opening, a float valve controlling said drain opening and adapted to be raised by a pull chain to open said opening and to return toward a closed position as the water level falls in the tank, said pull chain being connected with said float valve and extending generally upwardly therefrom, said water saving device adapted to be attached in the vicinity of a connection point between the pull chain and float valve and comprising:

a main body having a central opening adapted to receive therethrough the pull chain when the main body is positioned on the float valve, said main body including a chain access slit extending outwardly from said central opening to the perimeter of said main body; and a second main body also having a central opening and access slit extending from said opening to the periphery of said second main body, said second main body and said main body having irregular configurations that interlock when the main bodies are placed one on top of the other with the respective access slits positioned out of registry with one another.

4. The water saving device of claim 3, wherein the irregular configurations that interlock prevent the main bodies lying one on top another from rotating vis-à-vis each other.

5. A water saving device for flush toilets of the type having a water tank with a drain opening, a float valve controlling said drain opening and adapted to be raised by a pull chain to open said opening and to return toward a closed position as the water level falls in the tank, said pull chain being connected with said float valve and extending generally upwardly therefrom, said water saving device adapted to be attached in the vicinity of a connection point between the pull chain and float valve and comprising:

a main body having a central opening adapted to receive therethrough the pull chain when the main body is positioned on the float valve, said main body including a chain access slit extending outwardly from said central opening to the perimeter of said main body and staple insertion holes through said main body on opposite sides of said slit;

a staple which straddles said chain access slit and both ends of which pass through the respective insertion holes whereby the staple closes the slit to prevent the device from separating from the chain.

\* \* \* \* \*